UNITED STATES PATENT OFFICE.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

RED AZO DYE AND PROCESS OF MAKING SAME.

SPECIFICATION forming part of Letters Patent No. 677,516, dated July 2, 1901.

Application filed February 25, 1901. Serial No. 48,739. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Red Azo Dye and Process of Making Same; and we hereby declare the following to be a clear and exact description of our invention.

In two applications for Letters Patent filed February 20, 1901, and bearing Serial Nos. 48,167 and 48,168, we have described the production of new simple or mixed guanidin derivatives of amidonaphthol sulfonic acids which have the following general formula:

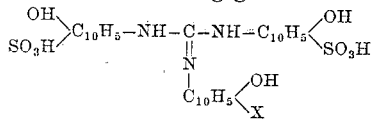

in which formula X means a hydrogen atom which can be replaced by a sulfonic group and which can be produced by treating the thio-urea compounds of amidonaphthol sulfonic acids having the formula:

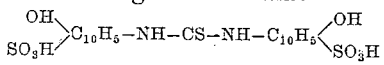

with amidonaphthols or amidonaphthol sulfonic acids (such as beta$_1$-amido-alpha$_3$-naphthol, beta$_1$-amido-beta$_4$-naphthol, beta$_1$-amido-alpha$_3$-naphthol-beta$_4$-sulfonic acid, alpha$_1$-amido-alpha$_3$-naphthol-beta$_4$-sulfonic acid, beta$_1$-amido-alpha$_4$-naphthol-beta$_3$-sulfonic acid, or the like) in the presence of agents capable of absorbing sulfureted hydrogen, such as lead oxid or the like.

Our present invention relates to the production of valuable new azo coloring-matters by causing three molecules of either the same or different diazo compounds to act on the said guanidin derivatives.

We point out specifically that by the term "diazo compound" in the following specification we intend to denote a simple diazo compound as well as a diazotized amidoazo compound, such as diazoazobenzene, diazoazotoluene, or the like.

The new azo dyestuffs are alkaline salts of acids having the following general formula:

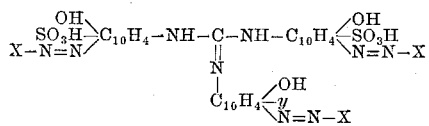

in which formula X—N=N— mean radicals of either the same or different diazo compounds, *y* means a hydrogen atom which can be replaced by a sulfonic group and which are from reddish-brown to dark-brown powders soluble in water with from orange to bluish-red color. They dye unmordanted cotton from orange to bluish-red shades.

In carrying out our new process practically we can proceed as follows, the parts being by weight: 36.3 parts of para-xylidin are diazotized in the usual manner with the aid of one hundred and eighteen parts of hydrochloric acid (of 15° Baumé) and twenty-one parts of sodium nitrite. The resulting diazo solution is then slowly stirred into a solution prepared from 72.5 parts of the guanidin derivative, (prepared from the thio-urea compound of beta$_1$-amido-alpha$_3$-naphthol-beta$_4$-sulfonic acid and beta$_1$-amido-alpha$_3$-naphthol-beta$_4$-sulfonic acid,) having in a free state the formula:

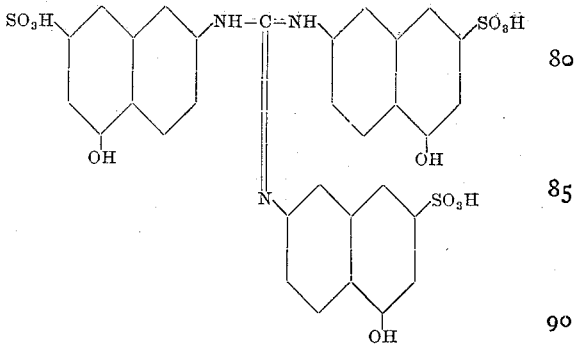

and one hundred and sixty-eight parts of sodium carbonate, (Na$_2$CO$_3$.) After having stirred for several hours the formation of the dyestuff will be finished. The latter is separated from the mixture by the addition of common salt and isolated by filtration. The new coloring-matter thus obtained is the sodium salt of an acid having in a free state most probably the following formula:

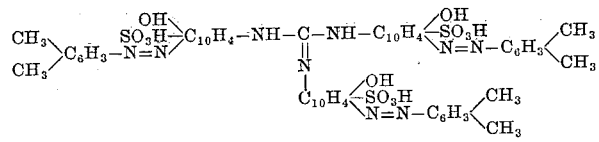

and is a reddish-brown powder having a metallic luster soluble in water with a red color. It is insoluble in concentrated hydrochloric acid, while it is dissolved by concentrated sulfuric acid (of 66° Baumé) with a bluish-red color, which is not changed on the addition of a small quantity of ice, while on the addition of a larger quantity of ice a dark-brown precipitate is obtained.

The new coloring-matter dyes unmordanted cotton red shades.

The process proceeds in an analogous manner, if instead of the diazo compound mentioned in the example other diazo compounds are employed. On using, for instance, one molecule of beta-naphthylamin and two molecules of ortho-anisidin or one molecule of amidoazo-benzene, one molecule of beta-naphthylamin, and one molecule of para-toluidin bluish-red dyestuffs are obtained.

Having now described our invention and in what manner the same is to be performed, what we claim as new, and desire to secure by Letters Patent, is—

1. The process for producing new azo dyestuffs which process consists in combining three molecules of diazo compounds with one molecule of the herein-defined guanidin derivatives having in a free state the general formula:

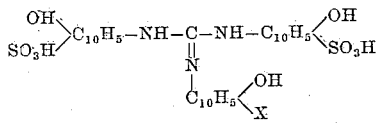

in which formula X means a hydrogen atom which may be replaced by a sulfonic group then precipitating the resulting dyestuffs by means of a suitable salt and finally isolating the same from the reaction mixture, substantially as hereinbefore described.

2. The process for producing a new trisazo dyestuff which process consists in first combining three molecules of diazotized para-xylidin with one molecule of the guanidin derivative obtained from the thio-urea compound of $beta_1$-amido-$alpha_3$-naphthol-$beta_4$-sulfonic acid and from $beta_1$-amido-$alpha_3$-naphthol-$beta_4$-sulfonic acid having the following formula:

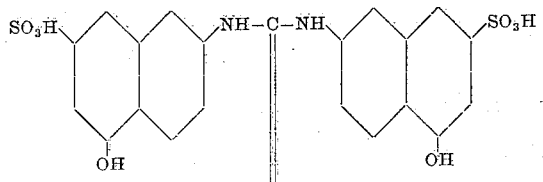

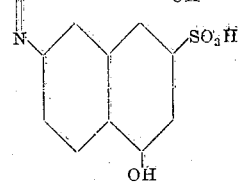

secondly precipitating the resulting dyestuff with the aid of a suitable salt, and finally isolating the same from the reaction mixture, substantially as hereinbefore described.

3. The herein-described new azo dyestuffs which are alkaline salts of acids having most probably the following formula:

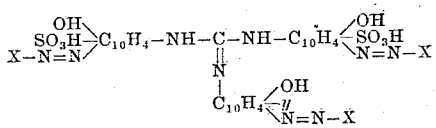

in which formula $X-N=N-$ and $y$ have the herein-defined meaning, and which are from reddish-brown to dark-brown powders having a metallic luster, soluble in water with from orange to bluish-red color and dyeing unmordanted cotton from orange to bluish-red shades, substantially as hereinbefore described.

4. The herein-described new trisazo dyestuff being an alkaline salt of an acid having most probably the following formula:

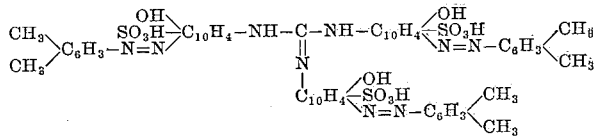

which in the form of its sodium salt is a reddish-brown powder having a metallic luster, soluble in water with a red color, insoluble in concentrated hydrochloric acid, being dissolved by concentrated sulfuric acid of 66° Baumé with bluish-red color which is not changed on the addition of a small quantity of ice, while on the addition of a larger quantity of ice a dark-brown precipitate is obtained, dyeing unmordanted cotton red shades, substantially as hereinbefore described.

In testimony whereof we have signed our names in the presence of two subscribing witnesses.

ADOLF ISRAEL.
RICHARD KOTHE.

Witnesses:
OTTO KÖNIG,
EMIL BLOMBERG.